United States Patent
Kii

(10) Patent No.: US 8,863,887 B2
(45) Date of Patent: Oct. 21, 2014

(54) UTILITY VEHICLE

(71) Applicant: Kawasaki Jukogyo Kabushiki Kaisha, Hyogo (JP)

(72) Inventor: Hideaki Kii, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 7 days.

(21) Appl. No.: 13/780,384

(22) Filed: Feb. 28, 2013

(65) Prior Publication Data

US 2014/0238185 A1 Aug. 28, 2014

(51) Int. Cl.
*F16H 57/04* (2010.01)
*F16H 57/027* (2012.01)

(52) U.S. Cl.
CPC .......... *F16H 57/027* (2013.01); *F16H 57/0489* (2013.01)
USPC ........................ 180/339; 74/606 A; 296/24.34

(58) Field of Classification Search
CPC ............ F16H 57/0489; F16H 57/0416; F16H 57/0415; F16H 57/0412; F16H 57/048; B60K 13/02; B60K 13/00; B60K 13/06; B60K 11/00; B60K 11/06; B60K 11/08; B60K 11/085; B60K 17/00

USPC ............... 180/374, 339, 364, 366, 68.3, 68.1; 474/93; 165/44, 42, 41; 74/606 A; 296/24.34

See application file for complete search history.

(56) References Cited

U.S. PATENT DOCUMENTS

| | | | |
|---|---|---|---|
| 7,168,516 B2 * | 1/2007 | Nozaki et al. | 180/68.3 |
| 8,002,061 B2 * | 8/2011 | Yamamura et al. | 180/68.1 |
| 8,302,711 B2 * | 11/2012 | Kinsman et al. | 180/41 |
| 2010/0155170 A1 * | 6/2010 | Melvin et al. | 180/339 |

FOREIGN PATENT DOCUMENTS

JP 2010-151237 7/2010

\* cited by examiner

*Primary Examiner* — Keith Frisby
(74) *Attorney, Agent, or Firm* — Wenderoth, Lind & Ponack, L.L.P.

(57) ABSTRACT

A utility vehicle which can shorten the entire length of an air intake duct includes a belt-type continuously variable transmission that converts and transmits a driving force from an engine, a transmission case that accommodates the continuously variable transmission, an air intake duct that introduces outside air into the transmission case, and an exhaust duct that discharges air in the transmission case, wherein the transmission case is provided in a console box, and an air intake port of the air intake duct is arranged in the console box.

6 Claims, 6 Drawing Sheets

UTILITY VEHICLE

BACKGROUND OF THE INVENTION

1. Field of the Invention

The present invention relates to a utility vehicle including a belt-type continuously variable transmission.

2. Description of the Related Art

Conventionally, in a utility vehicle including a belt-type continuously variable transmission, for example, as disclosed in Japanese Unexamined Patent Publication No. 2010-151237, to cool the belt, outside air is introduced into the transmission case accommodating the continuously variable transmission.

Here, in the utility vehicle, typically, the engine and the transmission are arranged in the console, and the air intake port of the air intake duct that introduces outside air into the transmission case is provided on the rear side of the hood. Therefore, the distance from the air intake port of the air intake duct to the air intake connection opening of the transmission case becomes long, and as a result, the entire length of the air intake duct becomes long.

SUMMARY OF THE INVENTION

An object of the present invention is therefore to provide a utility vehicle which can shorten the entire length of an air intake duct.

To achieve the above object, the present invention provides a utility vehicle including a belt-type continuously variable transmission that converts and transmits a driving force from an engine, a transmission case that accommodates the continuously variable transmission, an air intake duct that introduces outside air into the transmission case, and an exhaust duct that discharges air in the transmission case, wherein the transmission case is provided in a console box, and an air intake port of the air intake duct is arranged in the console box.

According to the above configuration, the air intake port of the air intake duct is arranged in the console box in which the transmission case is arranged. The entire length of the air intake duct can thus be shortened.

Preferably, the present invention further includes the following configurations.

(1) The air intake duct is arranged in the console box.

(2) The console box is provided therein with a partitioning plate partitioning an inside of the console box into upper and lower sections, the engine is arranged below the partitioning plate, and the air intake port is arranged above the partitioning plate.

(3) The air intake duct extends upward from an air intake connection opening of the transmission case to the air intake port via a bent portion that is bent rearward and downward from above.

(4) In the configuration (3), the air intake port is opened downward.

(5) The air intake duct is provided in the console box such that the air intake duct and an engine air intake duct of the engine are arranged side by side in a vehicle width direction.

(6) An exhaust port of the exhaust duct is provided with a guiding member that guides exhaust gas from the exhaust duct to an exhaust gas sensor attached to exhaust pipes of the engine.

According to the configuration (1), the entire air intake duct is provided in the console box in which the transmission case is arranged. The entire length of the air intake duct can thus be further shortened.

According to the configuration (2), upward moving of air around the engine heated by the engine is inhibited by the partitioning plate. An increase in temperature around the air intake port of the air intake duct can thus be prevented.

According to the configuration (3), the air intake duct is provided in front of the air intake port. The air intake duct thus blocks air from the front to prevent the air intake port from directly taking in contaminated air.

According to the configuration (4), dirt or the like falling from the upper wall or the like in the console box can be prevented from entering the air intake port.

According to the configuration (5), the engine air intake duct and the transmission air intake duct can be efficiently arranged in the console box. In addition, while being arranged in the console box, the engine air intake duct and the transmission air intake duct are arranged side by side in the vehicle width direction. The console box can thus be prevented from being larger.

According to the configuration (6), the exhaust gas sensor attached to the exhaust pipes of the engine can be cooled by exhaust gas from the transmission case.

In short, according to the present invention, the utility vehicle which can shorten the entire length of the air intake duct can be provided.

DETAILED DESCRIPTION OF THE INVENTION

Figure 1:
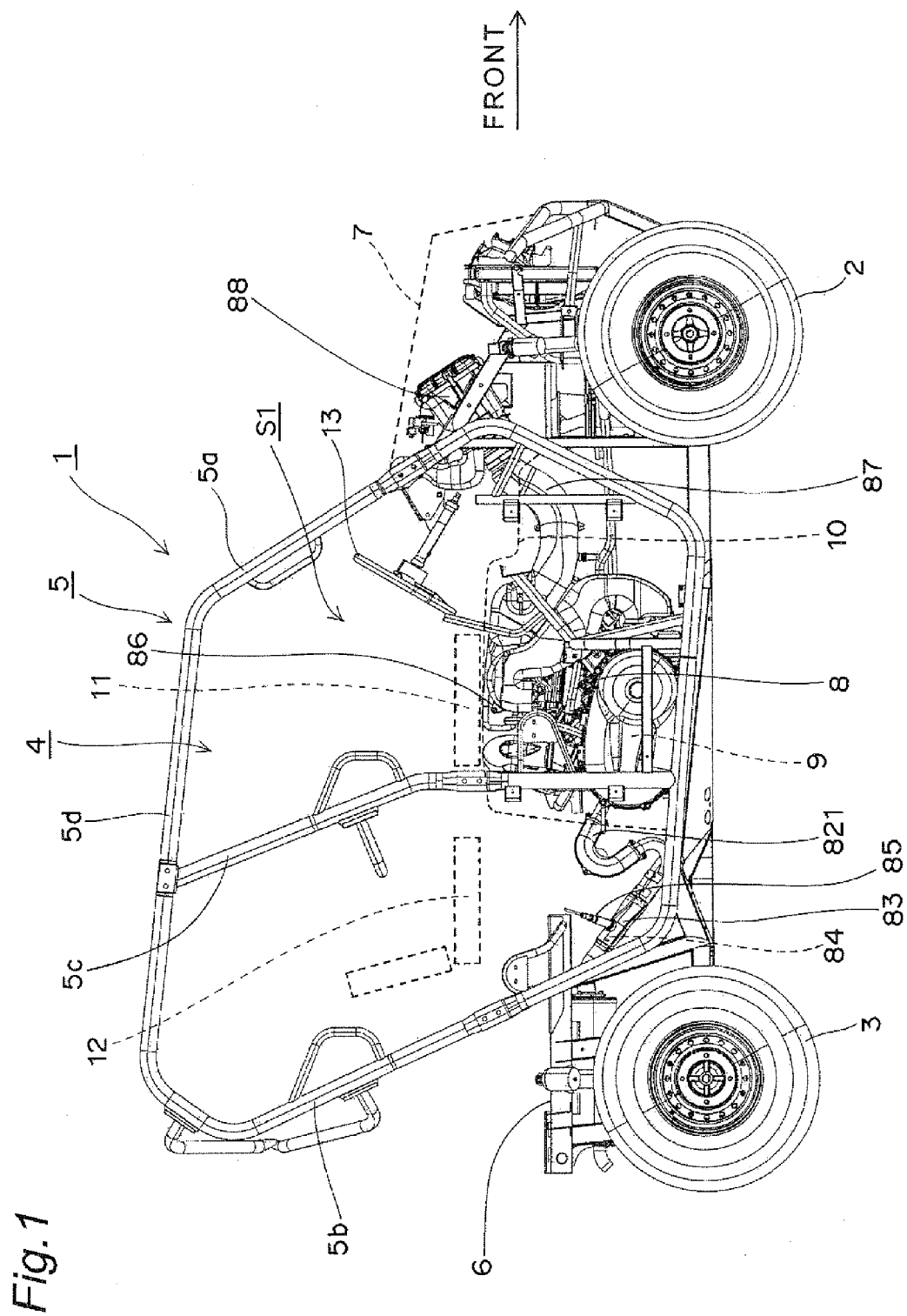
FIG. 1 is a schematic side view of a utility vehicle according to an embodiment of the present invention.
Figure 2:
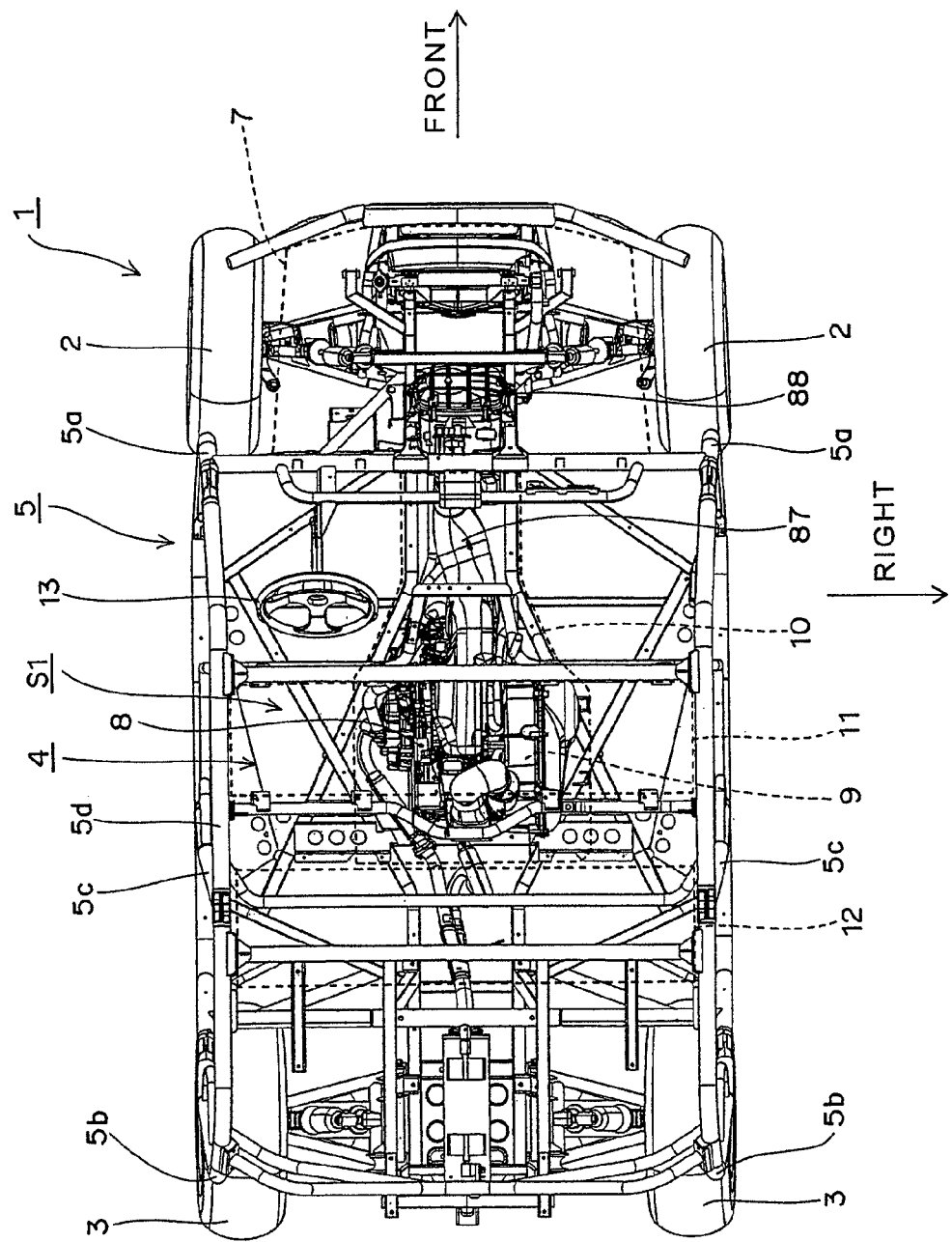
FIG. 2 is a schematic top view of the utility vehicle of FIG. 1.

FIG. 1 is a schematic side view of a utility vehicle according to an embodiment of the present invention. FIG. 2 is a schematic top view of the utility vehicle of FIG. 1. The concept of the directions used in this embodiment coincides with the concept of the directions seen from a driver in the utility vehicle. In FIGS. 1 and 2, some members indicated by dashed lines are shown in perspective.

[Overall Configuration of Vehicle]

As shown in FIGS. 1 and 2, a utility vehicle 1 includes a pair of left and right front wheels 2 in the front portion of the vehicle body thereof, a pair of left and right rear wheels 3 in the rear portion of the vehicle body thereof, and a riding space (cabin) 4 between the front wheels 2 and the rear wheels 3. The riding space 4 is surrounded by a ROPS 5. The ROPS 5 is the abbreviation of a rollover protective structure, is a portion of a body frame, and includes a pair of left and right front vertical members 5a, a pair of left and right rear vertical members 5b, a pair of left and right intermediate vertical members 5c arranged between the front vertical members 5a and the rear vertical members 5b, and a plurality of upper end beam members 5d connecting the upper ends of the vertical members 5a, 5b, and 5c. A cargo bed 6 is provided behind the riding space 4. A hood 7 is provided in front of the riding space 4. A bench-type front seat 11 is provided in the front half of the riding space 4. A bench-type rear seat 12 is provided in the rear half of the riding space 4. A left seat region S1 of the front seat 11 is a driver's seat. An operating portion of a steering wheel 13 is provided in front of the left seat region S1.

At the center in the vehicle width direction, a console box 10 is provided below the front seat 11 so as to extend from the front of the front seat 11 to the front portion of the rear seat 12. An engine 8 is arranged in the console box 10. A belt-type continuously variable transmission 9 is arranged on the right side of the engine 8, and converts and transmits a driving force from the engine 8. The continuously variable transmission 9 automatically performs gear-shifting according to the increase and decrease in the rotational speed of the engine 8 and the load on the wheel side.

Figure 3:
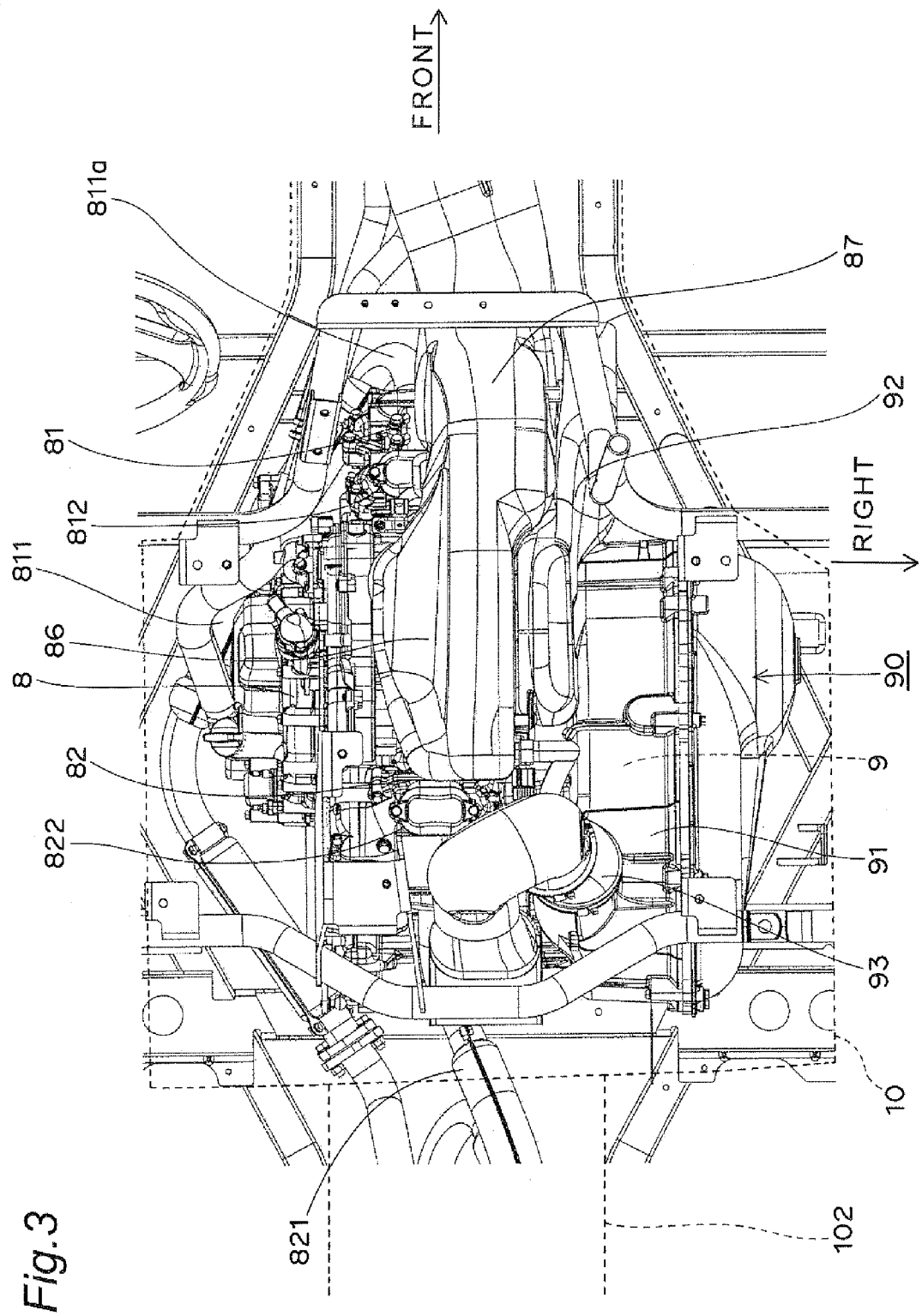
FIG. 3 is an enlarged view of an engine 8 of FIG. 2.
Figure 4:
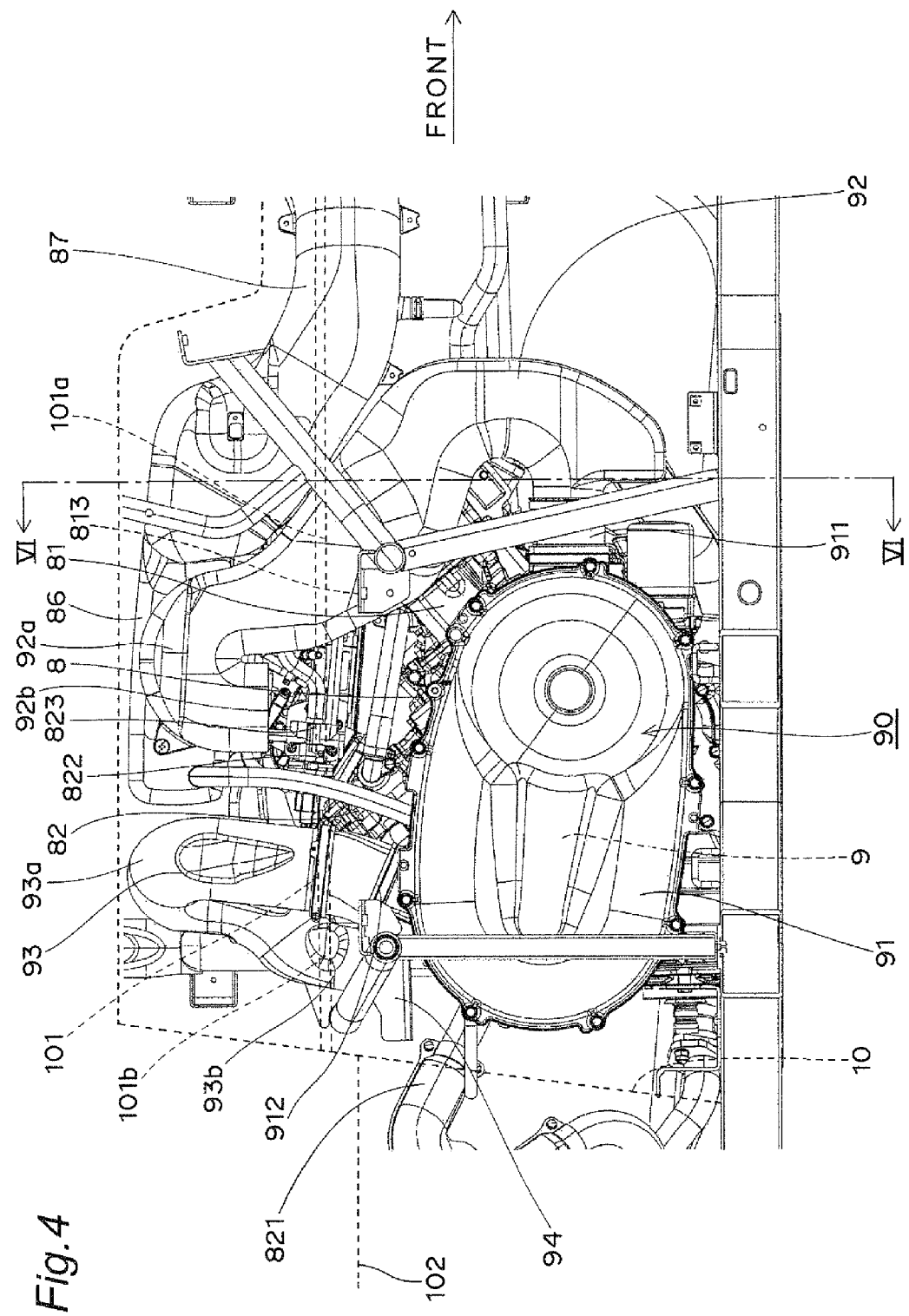
FIG. 4 is a side view of FIG. 3.
Figure 5:
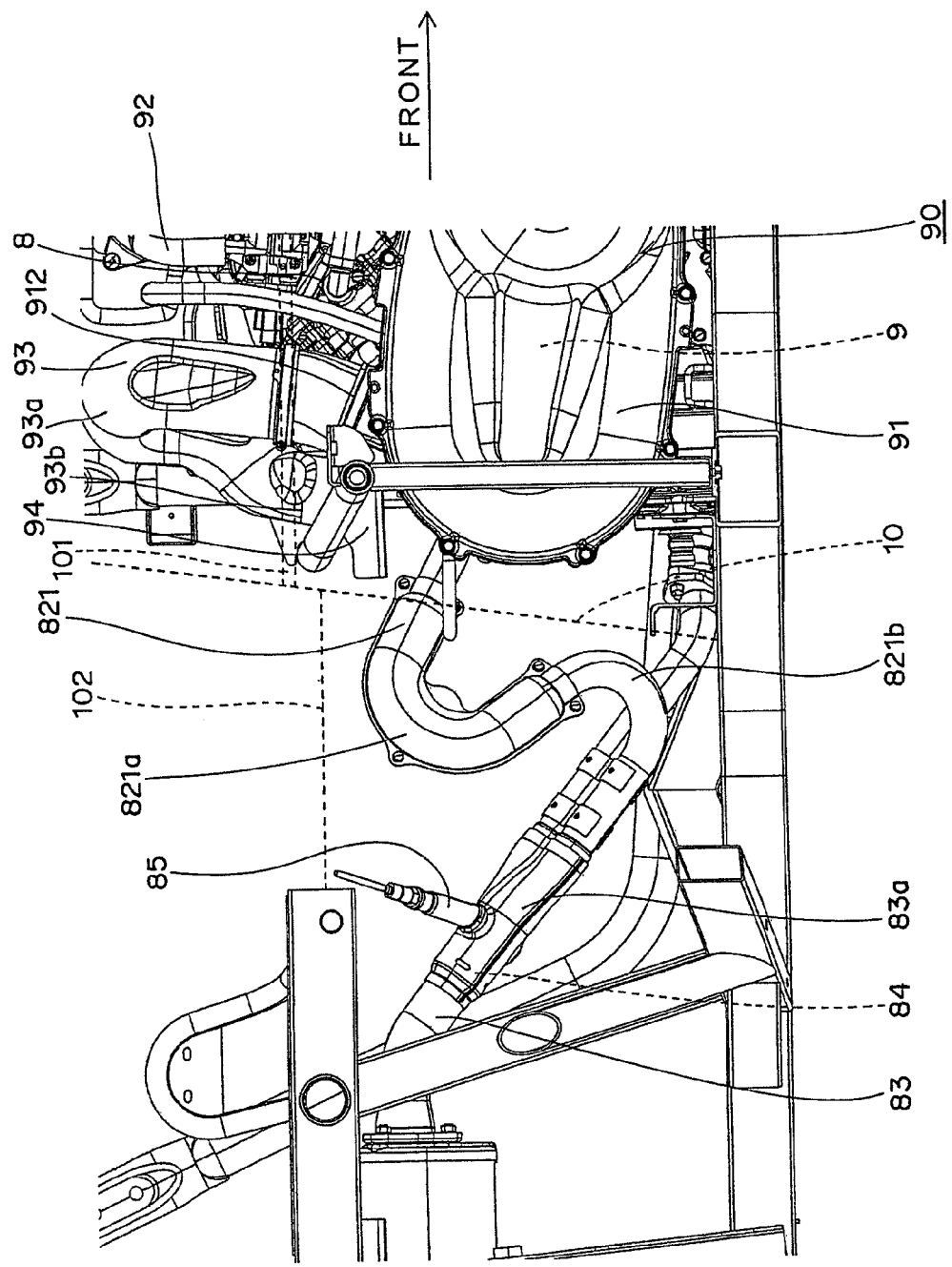
FIG. 5 is an enlarged side view of the rear portion of the engine 8.

FIG. 3 is an enlarged view of the engine 8 of FIG. 2. FIG. 4 is a side view of FIG. 3. As shown in FIGS. 3 and 4, the engine 8 is a V-type two-cylinder engine, and includes a forward-tilted front cylinder 81 and a rearward-tilted rear cylinder 82. A front cylinder exhaust pipe 811 connected to the front cylinder 81 extends forward from the connection opening with the front cylinder 81, extends rearward via a bent portion 811a that is bent from the front to the rear, and extends rearward through the rear surface of the console box 10. FIG. 5 is an enlarged side view of the rear portion of the engine 8. As shown in FIGS. 3 to 5, a rear cylinder exhaust pipe 821 connected to the rear cylinder 82 extends rearward from the connection opening with the rear cylinder 82, extends through the rear surface of the console box 10, and further extends rearward via a first bent portion 821a that is bent from the rear to the front and a second bent portion 821b that is bent from the front to the rear, in this order. A gathering portion 83a is the front end of a gathering pipe 83 gathering the front cylinder exhaust pipe 811 and the rear cylinder exhaust pipe 821. The front cylinder exhaust pipe 811 and the rear cylinder exhaust pipe 821 are gathered in the gathering portion 83a behind the engine 8 and the console box 10. A catalyst 84 that purifies exhaust gas is provided on the exhaust downstream side of the gathering portion 83a. An exhaust gas sensor 85 that senses the ingredient in exhaust gas is provided on the gathering pipe 83 on the exhaust downstream side of the gathering portion 83a and on the exhaust upstream side of the catalyst 84. The exhaust gas sensor 85 includes, e.g., an oxygen concentration sensor sensing the oxygen concentration in exhaust gas (O2 sensor) and an air/fuel ratio sensor sensing the air/fuel ratio in exhaust gas.

As shown in FIGS. 3 and 4, a throttle body 813 is connected to an air intake port 812 of the front cylinder 81, a throttle body 823 is connected to an air intake port 822 of the rear cylinder 82, and an air intake chamber 86 is connected to the throttle bodies 813 and 823. An engine air intake duct 87 is connected to the air intake chamber 86. As shown in FIGS. 1 and 2, the air intake duct 87 extends forward in the console box 10, and further extends through the front upper surface of the console box 10 to an air cleaner 88 in the hood 7. The air cleaner 88 has a substantially rectangular parallelepiped shape extending obliquely upward, and an end thereof is opened forward. Air is introduced from the opening of the end.

As shown in FIGS. 3 to 5, a transmission unit 90 includes the continuously variable transmission 9, a transmission case 91 that accommodates the continuously variable transmission 9, an air intake duct 92 that delivers air into the transmission case 91, and an exhaust duct 93 that discharges air in the transmission case 91. An air intake connection opening 911 is formed to project forward from the front portion of the transmission case 91. The air intake duct 92 is connected to the air intake connection opening 911. The air intake duct 92 extends upward from the air intake connection opening 911 of the transmission case 91 to an air intake port 92b via a bent portion 92a that is bent rearward and downward from above. The air intake duct 92 is thus located so as to cover the front of the air intake port 92b. The air intake port 92b is opened downward, and air is introduced thereinto.

As shown in FIG. 4, the console box 10 is provided therein with a partitioning plate 101 that divides the inside of the console box into upper and lower sections. The engine 8, in particular, the portion of the engine 8 below the front cylinder 81 and the rear cylinder 82 is arranged below the partitioning plate 101. The air intake port 92b of the air intake duct 92 is arranged above the partitioning plate 101. The partitioning plate 101 is formed to connect a front portion 101a partitioning the front portion of the console box 10 into upper and lower sections and a rear portion 101b partitioning the rear portion of the console box 10 into upper and lower sections. The front portion 101a and the rear portion 101b are made of rubber having heat resistance and heat insulation properties. The air intake chamber 86 is located above the partitioning plate 101.

Figure 6:
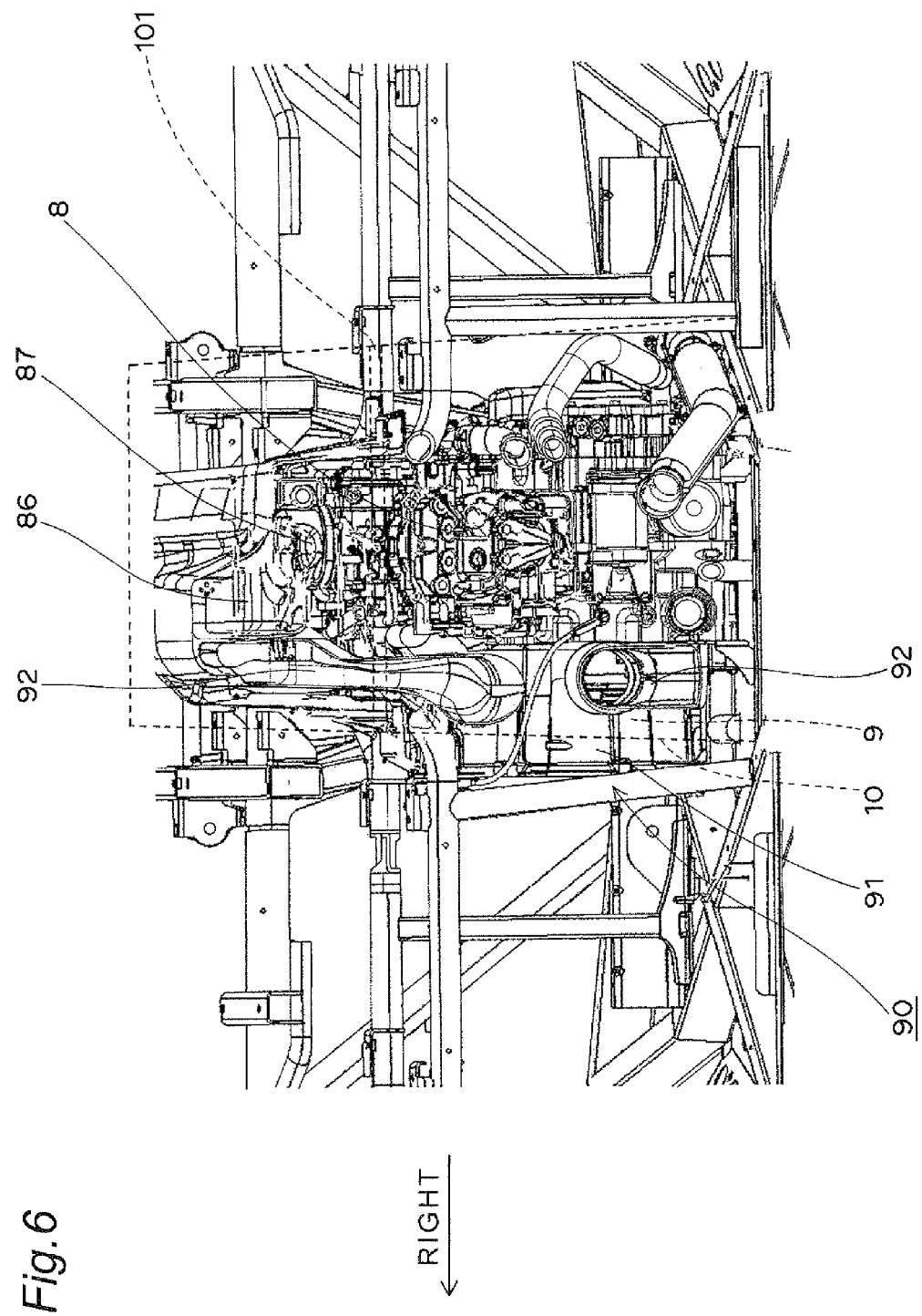
FIG. 6 is a perspective sectional view taken along line VI-VI of FIG. 4.

FIG. 6 is a perspective sectional view taken along line VI-VI of FIG. 4. As shown in FIG. 6, the air intake duct 92 is arranged side by side with the engine air intake duct 87 of the engine 8 in the vehicle width direction in the console box 10, and is provided on the right side of the engine air intake duct 87. The upper portion of the air intake duct 92 has a vertical cross section which is short in the vehicle width direction and long in the up-down direction and a horizontal cross section which is short in the vehicle width direction and long in the front-rear direction so as to ensure the cross-sectional area of the air intake duct 92, while the air intake duct 92 and the engine air intake duct 87 are arranged side by side in the left-right direction in the console box 10. The upper portion of the air intake duct 92 is supported by the air intake chamber 86.

As shown in FIG. 4, an exhaust connection opening 912 is formed to project upward from the rear portion of the transmission case 91. The exhaust duct 93 is connected to the exhaust connection opening 912. The exhaust duct 93 extends upward from the exhaust connection opening 912 of the transmission case 91 to an exhaust port 93b via a bent portion 93a bent downward from above. As shown in FIG. 5, the exhaust port 93b of the exhaust duct 93 is provided with a guiding member 94. The guiding member 94 guides exhaust gas from the exhaust duct 93 to the exhaust gas sensor 85, which is attached to the gathering pipe 83 gathering the front cylinder exhaust pipe 811 and the rear cylinder exhaust pipe 821 of the engine 8. The guiding member 94 is formed of sheet metal. The exhaust gas sensor 85 is located substantially in the same position as the guiding member 94 in the vehicle width direction and in the up-down direction, and is located behind the guiding member 94. The guiding member 94 has an upper surface connected to the exhaust duct 93, side walls in the vehicle width direction, a bottom wall, and an opening in the rear surface thereof. Here, the guiding member 94 is located below the partitioning plate 101 in the console box 10. Behind the console box 10, a floor tunnel 102 is provided to extend through the rear surface of the console box 10. The gathering pipe 83 and the exhaust gas sensor 85 are located in the floor tunnel 102. As a result, exhaust gas from the exhaust duct 93 is discharged substantially rearward by the guiding member 94, and then passes through the inside of the floor tunnel 102 to abut onto the exhaust gas sensor 85. The guiding member 94 is located below the partitioning plate 101.

The utility vehicle 1 having the above configurations can exhibit the following effects.

(1) The air intake port 92b of the air intake duct 92 is arranged in the console box 10 in which the transmission case 91 is arranged. The entire length of the air intake duct 92 can thus be shortened. Conventionally, the air intake duct is divided because the air intake duct becomes long when the air intake port of the air intake duct is provided on the rear side of the hood. In this embodiment, by shortening the entire length of the air intake duct 92, the air intake duct 92 can be integral without being divided. As a result, the air intake duct 92 can be easily detached from the transmission case 91, and drain connection in the air intake duct 92 can also be easily performed.

(2) The entire air intake duct 92 is provided in the console box 10 in which the transmission case 91 is arranged. The entire length of the air intake duct 92 can thus be further shortened.

(3) The console box 10 is provided therein with the partitioning plate 101 partitioning the inside of the console box 10 into upper and lower sections, the engine 8 is arranged below the partitioning plate 101, and the air intake port 92b of the air intake duct 92 is arranged above the partitioning plate 101. Therefore, the upward moving of air around the engine 8 heated by the engine 8 is inhibited by the partitioning plate 101. The temperature increase around the air intake port 92b of the air intake duct 92 can thus be prevented.

(4) The air intake duct 92 extends upward from the air intake connection opening 911 of the transmission case 91 to the air intake port 92b via the bent portion 92a bent rearward and downward from above. Therefore, the air intake duct 92 is provided in front of the air intake port 92b, and as a result, the air intake duct 92 blocks air from the front to prevent the air intake port 92b from directly taking in contaminated air.

(5) The air intake port 92b is opened downward. Dirt or the like falling from the upper wall or the like in the console box 10 can thus be prevented from entering the air intake port 92b.

(6) The air intake duct 92 is provided in the console box 10 such that the air intake duct 92 and the engine air intake duct 87 of the engine 8 are arranged side by side in the vehicle width direction. The engine air intake duct 87 and the transmission air intake duct 92 can be efficiently arranged in the console box 10. In addition, while being arranged in the console box 10, the air intake duct 87 of the engine 8 and the air intake duct 92 of the transmission 9 are arranged side by side in the vehicle width direction. The console box 10 can thus be prevented from being larger.

(7) The exhaust port 93b of the exhaust duct 93 is provided with the guiding member 94. The guiding member 94 guides exhaust gas from the exhaust duct 93 to the exhaust gas sensor 85, which is attached to the gathering pipe 83 gathering the front cylinder exhaust pipe 811 and the rear cylinder exhaust pipe 821 of the engine 8. Therefore, the exhaust gas sensor 85 attached to the gathering pipe 83 of the engine 8 can be cooled by exhaust gas from the transmission case 91.

(8) The transmission 9 is cooled by using air in the console box 10 to exhaust it to the outside of the console box 10. The temperature increase in the console box can thus be prevented.

(9) The guiding member 94 is located below the partitioning plate 101 in the console box 10. Therefore, the upward moving of exhaust gas from the transmission case 91 can be inhibited by the partitioning plate 101. The temperature increase around the air intake port 92b of the air intake duct 92 can thus be prevented.

(10) The bent portion 92a bent downward from above is provided in the air intake duct 92. The bent portion 93a bent downward from above is provided in the exhaust duct 93. Therefore, the bent portion 92a of the air intake duct 92 and the bent portion 93a of the exhaust duct 93 are arranged relatively above. Even when the utility vehicle 1 enters a puddle, the bent portions 92a and 93a can prevent water from entering the transmission case 91 from the air intake port 92b or the exhaust port 93b.

In the above embodiment, the front seat 11 and the rear seat 12 are of bench type. However, the front seat 11 and the rear seat 12 may be of box type. When the front seat 11 and the rear seat 12 are of box type, the console box 10 is arranged to be sandwiched between the left and right front seats 11.

In the above embodiment, the engine 8 is a V-type two-cylinder engine. However, the present invention is applicable to other engines, e.g., a single-cylinder engine, an engine including a plurality of cylinders in series, and a V-type engine including three or more cylinders.

Various modifications and changes can also be made without departing from the spirit and scope of the present invention described in the claims.

The invention claimed is:

1. A utility vehicle comprising:
   a continuously variable transmission that converts and transmits a driving force from an engine, the continuously variable transmission having a belt;
   a transmission case that accommodates the continuously variable transmission;
   an air intake duct that introduces outside air into the transmission case; and
   an exhaust duct that discharges air in the transmission case, wherein the transmission case is provided in a console box, wherein an air intake port of the air intake duct is arranged in the console box,
   and wherein an exhaust port of the exhaust duct is provided with a guiding member that guides exhaust gas from the exhaust duct to an exhaust gas sensor attached to exhaust pipes of the engine.

2. The utility vehicle according to claim 1, wherein the air intake duct is arranged in the console box.

3. The utility vehicle according to claim 1, wherein the console box is provided therein with a partitioning plate partitioning an inside of the console box into upper and lower sections,
   the engine is arranged below the partitioning plate, and the air intake port is arranged above the partitioning plate.

4. The utility vehicle according to claim 1, wherein the air intake duct extends upward from an air intake connection opening of the transmission case to the air intake port via a bent portion bent rearward and downward from above.

5. The utility vehicle according to claim 4, wherein the air intake port is opened downward.

6. The utility vehicle according to claim 1, wherein the air intake duct is provided in the console box such that the air intake duct and an engine air intake duct of the engine are arranged side by side in a vehicle width direction.

* * * * *